United States Patent Office 2,708,208
Patented May 10, 1955

2,708,208

PRODUCTION OF PHENOLS

Kenneth E. Furman and Harry de V. Finch, Berkeley, Calif., assignors to Shell Development Company, San Francisco, Calif., a corporation of Delaware No Drawing. Application June 27, 1950,
Serial No. 170,698

13 Claims. (Cl. 260—621)

This invention relates to a process for the production of phenols from alicyclic ketones, and it more particularly relates to a process for the direct catalytic conversion of alicyclic ketones to phenols. In one of its specific aspects the invention relates to a process for directly converting cyclohexanone to phenol.

It has been indicated in the prior art that certain alicyclic ketones, such as cyclohexanone, can be converted to phenols by reaction in the vapor phase in the presence of specified catalysts. Only a very limited number of materials are known to be capable of catalyzing this conversion, or chemical reaction. The known catalysts in many cases have not been readily available or have been difficult to prepare, while in other cases unduly low conversions have been realized or the life of the catalyst under the operating conditions has been undesirably short. For these and other reasons there has been need for a new and improved process for accomplishing the conversion, characterized in part and based upon the use of newly discovered catalysts for the reaction.

An object of the present invention is a new and improved process for the direct conversion of alicyclic ketones to phenols, and a specific object is a new and improved process for the direct production of phenol from cyclohexanone. The provision of new catalysts for the conversion is still another object of the invention. A further object is a process for the conversion of an alicyclic ketone, such as cyclohexanone, in which the carbon atom of the carbonyl group is a member of a carbocyclic hexatomic ring, directly to a phenol in the vapor phase in the presence of an activated carbon catalyst. Still further objects of the invention will become apparent from the nature of the disclosures and the claims hereinafter.

It now has been discovered in accordance with the invention that alicyclic ketones, such as cyclohexanone, wherein the carbon atom of the carbonyl group is joined with other carbon atoms in a carbocyclic hexatomic ring, are directly converted to phenols when contacted at elevated temperatures with activated carbon. According to the process of the invention, phenols are produced by bringing an alicyclic ketone of the hereindefined class, such as cyclohexanone, preferably in the vapor phase, and active carbon into contact at an elevated temperature, separating the active carbon and the mixture of unreacted alicyclic ketone and reaction products, and recovering phenolic product from the mixture.

It will be observed that the conversion, for example, of cyclohexanone to phenol entails on the one hand removal of hydrogen from the alicyclic ring to form aromatic carbon-to-carbon multiple bonds between the carbon atoms that make up the ring and, on the other hand, addition of an atom of hydrogen to the carbonyl group to form a phenolic hydroxyl group that is linked to the ring carbon atom by a univalent bond. It was entirely unforeseen that active carbon would be capable of catalyzing the simultaneous occurrence of these reactions that lead to the formation of phenols from alicyclic ketones. From the standpoint of technical production of phenols from alicyclic ketones, the active carbons have shown the advantage of a desirably long catalyst life. The deposition of carbonaceous and tarry materials on the catalyst, which has been a drawback associated in varying degrees with the use of materials heretofore known to be active as catalysts for the conversion of alicyclic ketones to phenols, is surprisingly low when an active carbon is used as the catalyst, enabling advantageously long productive use of a given mass of active carbon catalyst in technical scale operations.

It has been found in accordance with the present invention that active carbon catalysts prepared from various carbonaceous materials can be used. The active carbon catalyst can be plain or ordinary charcoal produced, for example, by wood distillation or by carbonization of other vegetable materials, such as sugar, coal, lignite, nut shells, rice hulls, bone and sulfite cellulose liquors. While ordinary charcoal can be used as the catalyst, it is preferred to employ activated carbon as the catalyst, such as charcoal or other carbon that has been activated by subjecting to heating at temperatures greater than 300° C. and preferably above about 700° C., and as high as 1200° C., to the action of an oxidizing gas, such as steam, air, or chlorine, at from about 300° C. to about 800° C., to the action of a reducing gas at elevated temperatures, e. g., 300° C. to 800° C., or to combinations of such treatments. The active carbon catalyst may be used in any suitable form, such as lumps, fragments, and other relatively large pieces of regular or irregular contour, as a powder, supported on a supporting base, or in any other suitable form. Lump charcoal may be used as such. A powdered charcoal may be used in a "fluidized" form in a suitable reaction system, of types well-known to the art, or it may be pressed prior to use with the aid of binding materials if desired, into pellets, pills, or other larger masses.

The active carbon catalyst used in accordance with the present invention may consist of the carbon material, e. g., the activated carbon. In other cases it may also contain one or more promoters. Among the promoters that may be employed are, particularly, compounds of heavy metals, such as zinc oxide, chromium oxide, iron oxide, molybdenum sulfide, vanadium oxide, copper oxide, or the corresponding metals themselves. Because of a possibility that undesired side reactions would occur excessively should the active carbon catalyst contain too much of these or like promoters—which frequently are not without activity of their own as catalysts—only small amounts of promoters preferably are employed. The promoter, if employed, preferably amounts to not more than about 20% by weight of the catalyst mass, and preferred promoted carbon catalysts contain from about 2% to about 10% by weight of the promoter. The promoter may be incorporated in the active carbon catalyst by impregnating the carbon with a solution of a salt, e. g., the nitrate of the chosen metal, and heating the impregnated carbon to remove the solvent and to decompose the salt, or by any other suitable method known to those skilled in the art.

In general, highly satisfactory results are obtained when the activated carbon used as the catalyst is one that contains no added promoter. Because of their availability on a large scale at low cost, the activated carbons containing no added promoter are in general preferred as the catalyst.

It has been discovered that the active carbon catalysts employed according to the invention are effective for promoting the desired conversion over a wide range of temperatures. The reaction temperature may be as low as 225° C., while reaction temperatures as high as 650° C. can be used. A preferred temperature range is from about 350° C. to about 575° C.

When the process of the invention is carried out in a continuous manner, as is preferred, the alicyclic ketone is vaporized and the vapors are passed into contact with the catalyst at the desired operating temperature. The catalyst may be positioned in a suitable reaction zone, such as a reaction tube or a bank of reaction tubes surrounded by a heated fluid heat-transfer medium and the vaporous alicyclic ketone passed through the reaction zone containing the catalyst. The alicyclic ketone may be brought into the vapor state in a preheater, prior to its introduction into the reaction zone, or it may be introduced in liquid state into the forepart of the reaction zone wherein it is vaporized and passed to active contact with the catalyst. The reactor may be constructed of any suitable material, such as iron, glass, porcelain, or any of the various heat- and corrosion-resistant alloys, e. g., a chromium steel, a chromium-nickel steel, or other suitable alloy. The reactor may be brought to the reaction temperature before or after the vapors to be reacted are introduced thereinto. The reaction may be conducted in one or a plurality of reaction zones. If desired, the active carbon catalyst, when used in a finely-divided powder or dust form, may be suspended in a moving stream of the vaporous alicyclic ketone and passed along therewith to be subsequently separated, or the vapors of the alicyclic ketone may be led into a dense pseudo liquid turbulent mass of the catalyst, substantially stationary in bulk, and the phenolic product recovered from the vaporous mixture issuing therefrom.

When the process of the invention is carried out in a continuous manner, it is desirable to employ a rate of throughput consistent with a practical rate of production of phenols but which avoids excessive occurrence of undesired side reactions. The rate of throughput may be measured in quantitative terms, based upon the liquid hourly space velocity, which is numerically equal to the number of volumes of feed, measured in the liquid state, brought into contact with one volume of the active carbon catalyst per hour. The dimensions for measurement of the liquid hourly space velocity thus are reciprocal hours. The optimum liquid hourly space velocity will depend to a certain extent upon the reaction temperature, upon the particular alicyclic ketone being used, upon the specific catalyst that is employed, and upon whether diluents are present in the feed to the catalyst. While the optimum throughput rate thus depends upon a number of factors and because the complexity of these factors cannot be stated in general terms, it can be stated that liquid hourly space velocities from as low as 0.01 to as high as 25 may be used. A preferred range of liquid hourly space velocities is from about 0.1 to about 10. In computing the liquid hourly space velocity, the basis is the total feed to the catalyst.

It has been found that active carbon catalysts are effective when the alicyclic ketone is supplied in a vaporous mixture containing one or more diluent gases, as well as when substantially pure alicyclic ketone is contacted with the catalyst. The process of the invention thus may be carried out in the presence of suitable gaseous diluents, such as steam, nitrogen, methane, flue gas, hydrogen, etc. Good yields of phenol have been obtained from cyclohexanone over activated carbon in the presence of as much as 10.7 moles of steam per mole of the gaseous cyclohexanone. On the other hand, substantially pure vaporous cyclohexanone has been successfully converted to phenol by contact in accordance with the invention with activated carbon. Organic materials that in themselves would react under the operating conditions or that would tend to combine with either the alicyclic ketone or the phenolic product are, of course, less desirable as diluents. It is not necessary, however, to exclude in all cases other organic materials. Thus phenol can be produced efficiently according to the present invention from cyclohexanone in the presence of either or both of cyclohexanol and cyclohexane.

The process of the invention can be carried out at substantially atmospheric pressures, or subatmospheric pressures or superatmospheric pressures may be used.

The phenolic product can be recovered from the effluent from the reaction zone according to any suitable procedure, such as simple distillation of the condensed effluent, azeotropic distillation of the liquid products, fractional condensation of the gaseous effluent, absorption, or any other suitable method known to those skilled in the art.

The following examples will serve to illustrate certain of the possible specific embodiments of the invention. It will be appreciated that the examples are presented with the intent to illustrate rather than to limit the invention as defined in the hereto appended claims. In the examples the parts are parts by weight unless otherwise specified.

*Example 1*

In this and the other examples the reactor that was used comprised a steel tube 67 centimeters in length, having an inner diameter of 1.5 centimeters. In each of the examples the tube was filled with the active carbon catalyst, the volume of the catalyst being about 100 cubic centimeters. A thermocouple well having an external diameter of 0.6 centimeter extended coaxially throughout the length of the tube. The reaction tube was surrounded by thermostatically controlled electric heaters, by means of which the desired temperature was maintained. The alicyclic ketone and any other liquid feed components were led at the desired rate into a preheater wherein the feed was vaporized and the vapors led directly into the reaction tube containing the catalyst. The gaseous effluent from the reaction tube was passed through a water-cooled condenser in which the normally liquid products and any unreacted alicyclic ketone were condensed. A further small amount of material was condensed by passing any gases not liquefied in the water-cooled condenser through a trap cooled by a mixture of acetone and solid carbon dioxide, residual gases then being discarded. The liquid products, which usually separated into an aqueous layer and an oil layer, were worked up by separating the two layers and fractionally distilling the oil layer to recover the phenolic product. Traces of phenolic product contained in the water layer and in water separated during the distillation of the organic layer were determined by analysis and are included in the figures given in the examples.

In the first example the catalyst was walnut shell carbon. It was used in the form of particles, number 10–16 mesh size. A mixture of cyclohexanone and water containing 3.43 moles of cyclohexanone per mole of water was passed through the tube containing the active carbon catalyst at a temperature of 575° C. and a liquid hourly space velocity of 4.1 hours$^{-1}$. After 1.82 moles of cyclohexanone had been fed, the run was discontinued and the products were worked up as described above. It was found that 0.49 mole of phenol had been produced and that 0.98 mole of cyclohexanone remained unreacted.

*Example 2*

The experiment described in Example 1 was repeated employing a reaction temperature of 570° C. and a liquid hourly space velocity of 1.2 hours$^{-1}$. Upon working up the products in the manner described in Example 1, there were obtained 0.66 mole of phenol and 0.11 mole of unreacted cyclohexanone. A comparison of Examples 1 and 2 thus shows that under the conditions used the lower rate of throughput led to a higher conversion of cyclohexanone to phenol and only a slightly lower yield of phenol based upon the amount of cyclohexanone consumed.

Example 3

In this experiment there was employed the activated carbon prepared from wood carbon and known as "Norite" activated carbon. A mixture of cyclohexanone and water containing 0.72 mole of cyclohexanone and 0.21 mole of water was vaporized and the vapors passed through the reactor containing the catalyst at a temperature of 570° C. and a liquid hourly space velocity of 1.2 hour$^{-1}$. When the products from the run were worked up in the manner described in Example 1, there were recovered 0.22 mole of phenol and 0.09 mole of cyclohexanone.

Example 4

This example illustrates the process conducted with a promoted carbon catalyst. The catalyst was prepared by impregnating "Columbia" activated carbon, an activated carbon prepared from coconut shell, with an aqueous solution of chromium nitrate, drying and heating the impregnated carbon to convert the chromium nitrate to chromium oxide. A mixture of one mole of cyclohexanone and 0.30 mole of water was vaporized and the vapors passed over the catalyst at a temperature of 570° C. and a liquid hourly space velocity of 2.2 hours$^{-1}$. The reaction products then were worked up in the manner described in Example 1. There were recovered 0.54 mole of phenol and 0.14 mole of unreacted cyclohexaanone, corresponding to a 63% yield of phenol based upon the cyclohexanone consumed and a 54% conversion of the cyclohexanone fed to phenol.

Example 5

In this experiment the catalyst described in the preceding example was used. The feed to the catalyst contained 2.30 moles of cyclohexanone and 12.18 moles of water. It was passed over the catalyst at 550° C. at a liquid hourly space velocity of 1.2 hours$^{-1}$. It was found upon working up the products in the manner previously described that 1.40 moles of phenol had been produced and that 0.16 mole of cyclohexanone remained unreacted.

Example 6

In this experiment the catalyst was the same catalyst used in Examples 4 and 5. The feed was composed of cyclohexanone and water in the ratio of 19.3 moles of water per 1.80 moles of cyclohexanone. The reaction temperature of 500° C. was used, and the liquid hourly space velocity of 0.9 hours$^{-1}$. There were obtained from the products 1.06 moles of phenol and 0.15 of unreacted cyclohexanone, corresponding to a 64% yield of phenol based upon the cyclohexanone consumed and a 59% conversion of cyclohexanone fed to phenol. This and the preceding examples show that despite the increased dilution of the cyclohexanone with water, the active carbon catalyst efficiently converted the cyclohexanone to phenol.

Example 7

In this experiment the catalyst was an activated carbon prepared from coconut shell and known as "Columbia" activated carbon. A mixture of cyclohexanone and water containing six moles of water per mole of cyclohexanone was passed through the reactor containing the catalyst at a temperature of 500° C. and a liquid hourly space velocity of 0.6 hours$^{-1}$. Upon working up the collected products in the manner described in Example 1, it was found that phenol was produced in a yield of 58% based upon the cyclohexanone consumed and in a conversion of 27%, based upon the cyclohexanone fed.

Example 8

The catalyst used in this run was the activated carbon described in Example 7. The feed to the catalyst consisted of substantially pure vaporized cyclohexanone. The temperature of the catalyst during the run was about 500° C. The feed rate employed was equal to a liquid hourly space velocity of 0.7 hours$^{-1}$. By working up the products in the manner previously described, phenol was recovered in good yield and conversion.

Example 9

The catalyst used in this run was a lignite carbon known as "Darco" lignite carbon. The feed to the catalyst was composed of cyclohexanone and water present in amounts corresponding to 3.5 moles of cyclohexanone per mole of water. The catalyst temperature was about 575° C. and a feed rate corresponding to a liquid hourly space velocity of 1.1 hours$^{-1}$ was employed. Upon working up the products in the manner previously described phenol was found to have been produced in good yield and conversion.

Example 10

In this run there was employed a promoted catalyst prepared by impregnating activated wood carbon with an aqueous solution of zinc nitrate, drying the impregnated carbon and converting the zinc nitrate to zinc oxide by heating. The feed to the catalyst was composed of cyclohexanone and water in proportions corresponding to three moles of cyclohexanone per mole of water. The catalyst temperature was 490° C. and the feed rate (liquid hourly space velocity) was 1.2 hours$^{-1}$. Working up the products in the manner previously described resulted in recovery of phenol in good yield and conversion.

Although the process of the invention has been illustrated particularly by the conversion of cycohexanone to phenol, it will be distinctly understood that other alicyclic ketones wherein the carbon atom of the carbonyl group is joined in a carbo-cyclic hexatomic ring can also be converted to phenols in accordance with the invention. Representative of such other alicyclic ketones which can be thus converted to phenols in the manner described in the preceding examples include, among others, the following: cyclohexanone, 3-methylcyclohexanone, 3,3,5-trimethylcyclohexanone, 3,5,5-trimethyl-2-cyclohexene-1-one, 3-methyl-5,5-diethyl-2-cyclohexene-1-one, 3,3,5-tributylcyclohexanone, 4-methylcyclohexanone, 4-phenylcyclohexanone, 4-phenethylcyclohexanone, 1,4-cyclohexanedion, and like saturated, as well as unsaturated alicyclic ketones in which one or more of the hydrogen atoms on the nucleus may have been replaced by aliphatic or aromatic hydrocarbon radicals. Since cyclohexanone has evidenced particular refractoriness with respect to the direct conversion thereof to phenol, and in view of the extensive commercial utilization of phenol, the process of the present invention is particularly valuable for carrying out the direct conversion of cyclohexanone to phenol.

We claim as our invention:

1. The process for converting cyclohexanone to phenol which comprises contacting cyclohexanone in the vapor state as the only reactant with a catalyst consisting of activated carbon at a temperature within the range of from about 350° C. to about 575° C., separating the resulting gaseous mixture from the activated carbon, and recovering phenol from the mixture.

2. The process for converting cyclohexanone to phenol which comprises contacting a vaporous mixture consisting essentially of cyclohexanone and water with a catalyst consisting of active carbon at a temperature within the range of from about 350° C. to about 575° C., separating the resulting gaseous mixture from the active carbon catalyst and recovering phenol from the mixture.

3. The process for converting cyclohexanone to phenol which comprises contacting cyclohexanone in the vapor state with a catalyst composed of charcoal at a temperature within the range of from about 350° C. to about 575° C., separating the resulting gaseous mixture from the charcoal and recovering phenol from the mixture.

4. A process for the conversion of cyclohexanone to phenol which comprises contacting said cyclohexanone together with inert diluent gas with a catalyst composed of charcoal at a temperature within the range of from 225° C. to 650° C.

5. A process for converting a carbocyclic, monocyclic, alicyclic ketone wherein the carbon atom of the carbonyl group is joined in a hexatomic ring to a phenol which comprises bringing said alicyclic ketone in the vaporous state into contact with a catalyst composed of walnut shell charcoal at a temperature within the range of from about 350° C. to about 575. C.

6. A process for converting a carbocyclic, monocyclic, alicyclic ketone wherein the carbon atom of the carbonyl group is joined in a hexatomic ring to a phenol which comprises contacting a vaporous mixture consisting essentially of said alicyclic ketone and inert diluent gas with a catalyst consisting of activated carbon promoted by an oxide of a heavy metal selected from the group consisting of zinc oxide and chromium oxide associated therewith at a temperature within the range of from 350° C. to about 575° C.

7. A process for converting a carbocyclic, monocyclic, alicyclic ketone wherein the carbon atom of the carbonyl group is joined in a hexatomic ring to a phenol which comprises contacting said alicyclic ketone in the vaporous state in catalytic relation solely with charcoal and recovering a phenol.

8. A process for converting cyclohexanone to phenol which comprises contacting cyclohexanone in the vapor state in catalytic relation solely with charcoal at a temperature within the range of from about 350° C. to about 575° C.

9. A process for converting cyclohexanone to phenol which comprises passing a gaseous mixture composed of cyclohexanone and water into contact with a catalyst consisting of activated carbon at a temperature within the range of from about 350° C. to about 575° C. and recovering phenol from the product.

10. A process for converting cyclohexanone to phenol which comprises passing a gaseous stream comprising cyclohexanone and water into contact with a catalyst consisting of charcoal promoted by an oxide of a heavy metal in association therewith at a temperature within the range of from about 350° C. to about 575° C. and recovering phenol from the product.

11. A process for the conversion of cyclohexanone to phenol which comprises contacting a vaporous mixture composed of cyclohexanone and at least one of cyclohexanol, cyclohexane and inert diluent gas with a catalyst consisting of active carbon at a temperature within the range of from about 350° C. to about 575° C., separating the resulting gaseous mixture from the catalyst and recovering phenol from the mixture.

12. A process for the conversion of a carbocyclic, monocyclic, alicyclic ketone wherein the carbon atom of the carbonyl group is joined in a hexatomic ring to a phenol which comprises contacting a gaseous mixture composed of said alicyclic ketone and inert diluent gas with a catalyst of the group consisting of charcoal, activated carbon, and the same promoted by an oxide of a heavy metal selected from the group consisting of zinc oxide and chromium oxide associated therewith at a temperature of from about 350° C. to about 575° C.

13. A process for the conversion of a carbocyclic, monocyclic, alicyclic ketone wherein the carbon atom of the carbonyl group is joined in a hexatomic ring to a phenol which comprises contacting essentially solely said alicyclic ketone in the vapor phase at a temperature of from about 350° C. to about 575° C. with a catalyst of the group consisting of charcoal, activated carbon and the same promoted by an oxide of a metal selected from the group consisting of zinc and chromium.

References Cited in the file of this patent

UNITED STATES PATENTS

| | | |
|---|---|---|
| 1,913,941 | Mittasch et al. | June 13, 1933 |
| 2,052,917 | Bergstrom | Sept. 1, 1936 |
| 2,369,196 | Williams et al. | Feb. 13, 1945 |
| 2,369,197 | Winkler et al. | Feb. 13, 1945 |
| 2,413,598 | Ballard et al. | Dec. 31, 1946 |
| 2,503,641 | Taylor et al. | Apr. 11, 1950 |

OTHER REFERENCES

Linstead et al., "Dehydrogenation," Part III; Journal of Chemical Society (1940), pp. 1134–39.